United States Patent
Tamura et al.

(10) Patent No.: US 8,788,636 B2
(45) Date of Patent: Jul. 22, 2014

(54) BOOT CONTROLLING METHOD OF MANAGED COMPUTER

(75) Inventors: Naohiro Tamura, Kawasaki (JP); Sawao Iwatani, Kawasaki (JP); Kaoru Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1306 days.

(21) Appl. No.: 12/408,891

(22) Filed: Mar. 23, 2009

(65) Prior Publication Data

US 2009/0282142 A1 Nov. 12, 2009

(30) Foreign Application Priority Data

May 9, 2008 (JP) .................................. 2008-123374

(51) Int. Cl.
*G06F 15/177* (2006.01)
*G06F 11/00* (2006.01)
*G06F 9/44* (2006.01)

(52) U.S. Cl.
CPC .................................... *G06F 9/4416* (2013.01)
USPC ............................ 709/221; 709/222; 714/13

(58) Field of Classification Search
CPC ... G06F 9/4416; G06F 9/445; G06F 9/44505; H04L 29/12235; H04L 29/14; H04L 61/2023; H04L 41/08; H04L 41/0803; H04L 41/0806; H04L 41/0813
USPC ............ 709/200–222, 237; 713/1–2; 714/4.1, 714/4.11, 4.12, 13
See application file for complete search history.

(56) References Cited

U.S. PATENT DOCUMENTS

| | | | | |
|---|---|---|---|---|
| 5,812,751 | A | * | 9/1998 | Ekrot et al. ................... 714/4.21 |
| 7,334,027 | B2 | * | 2/2008 | Nakajima et al. ............. 709/221 |
| 7,444,502 | B2 | * | 10/2008 | Hatasaki et al. .............. 713/100 |
| 7,509,401 | B2 | * | 3/2009 | Takamoto et al. ............ 709/220 |
| 7,533,288 | B2 | * | 5/2009 | Hatasaki et al. .............. 714/4.4 |
| 7,657,778 | B2 | * | 2/2010 | Goto et al. ......................... 714/3 |
| 2007/0055853 | A1 | * | 3/2007 | Hatasaki et al. .................. 713/1 |

FOREIGN PATENT DOCUMENTS

| | | |
|---|---|---|
| JP | 2004-192105 | 7/2004 |
| JP | 2007-066216 | 3/2007 |
| JP | 2007-094611 | 4/2007 |

OTHER PUBLICATIONS

Notice of Reasons for Rejection mailed Aug. 7, 2012, from corresponding Japanese Patent Application No. 2008-123374 (with partial English translation).
Notice of Reasons for Rejection issued in corresponding Japanese Patent Application No. 2008-123374, mailed Nov. 6, 2012 (with partial English translation).

* cited by examiner

*Primary Examiner* — Patrice Winder
(74) *Attorney, Agent, or Firm* — Greer Burns & Crain, Ltd.

(57) ABSTRACT

A managed server (srv-10) is powered on by a power controlling unit. The managed server executes a POST process, and transfers a PXE request to a boot controlling unit. The boot controlling unit transfers an HBA vendor determining program. In the managed server, the WWN is set by an HBA vendor-dedicated program corresponding to an HBA vendor, and when a PCI initialization code can not be loaded, the POST process is re-started, and the PXE request is transferred again. The boot controlling unit transfers an NOP program, and the managed server starts an OS with a SAN boot.

9 Claims, 13 Drawing Sheets

FIG. 3

| SERVER NAME | MAC | IP | BOOT DESTINATION | BOOT STAGE | BOOT TIME | BOOT IMAGE | WWNN | WWPN | CONDITION | POWER | BMC | SPARE SERVER |
|---|---|---|---|---|---|---|---|---|---|---|---|---|
| srv-1 | mac-1 | ip-1 | san | 1 | — | — | wwn-1 | wwn-11, wwn-12 | ok | on | ip-b1 | srv-10 |
| srv-2 | mac-2 | ip-2 | net | 2 | 200802282100 | os-1 | wwn-2 | wwn-21 | ok | on | ip-b2 | srv-10 |
| ... | ... | ... | ... | ... | ... | ... | ... | ... | ... | ... | ... | ... |
| srv-10 | mac-10 | — | — | — | — | — | — | — | ok | off | ip-b10 | — |

BOOT CONTROLLING METHOD OF MANAGED COMPUTER

CROSS-REFERENCE TO RELATED APPLICATIONS

This application is based upon and claims the benefit of priority of the prior Japanese Patent Application No. 2008-123374, filed on May 9, 2008, the entire contents of which are incorporated herein by reference.

FIELD

The embodiments discussed herein are related to a boot controlling method, a computer system, and a computer readable storage medium storing a boot controlling program.

BACKGROUND

A computer system that boots up from a storage area network, or SAN, (a computer system in a SAN environment) has been known. In the computer system in the SAN environment, each server reads a program such as an OS (Operating System) from an external disk apparatus, which is a storage, through the SAN. Thereby, each server is booted up.

In the computer system in the SAN environment, a security function is provided to protect data of each logical unit in the storage in which the OS is installed. A WW (World Wide Name), which is a unique ID, is assigned to an FC (Fibre Channel) port on each server. In the security function of the computer system booting up from the SAN, the logical unit in which the OS is installed and the WWN of the FC port on the server are associated with each other, whereby access only from the FC port with the specific WWN is permitted.

In the computer system in the SAN environment, a variety of configurations are adopted to improve the reliability of such a computer system. For example, the computer system in the SAN environment is designed so that when a fault occurs in one server (primary computer), another server (spare computer) continues to execute a job of the faulty server. That is, the server has redundancy.

However, in the redundant configuration of the computer system booting up from the SAN, the WW assigned to the FC port of the operating computer and that assigned to the FC port of the waiting computer are different from each other. Therefore, when the primary computer is switched with the spare computer, the spare computer cannot directly utilize a software image including the OS used on the primary computer. Thus, it has been necessary to change the setting for the security function on the storage side by software for managing the SAN, or manually.

In the redundant computer system booting up from the SAN, a technique has been invented in which the software image including the OS can be directly utilized on the primary computer and the spare computer without changing the setting for the security function on the storage side (refer to Patent Document 1: Japanese Laid-Open Patent Publication No. 2007-94611). In this technique, the management server managing the computer system in the SAN environment collects and records information on the WW assigned to the FC port of the primary computer. When the primary computer is switched with the spare computer, the recorded WWN assigned to the FC port of the primary computer is set to the FC port of the spare computer, so that the software image including the OS of the primary computer can be utilized directly by the spare computer.

FIG. 15 illustrates a processing sequence by the redundant computer system booting up from the SAN.

The processing sequence illustrated in FIG. 15 is obtained by studying a SAN boot as referring to the above Patent Document 1.

When the management server instructs the primary computer to turn on the power (P51), the primary computer is powered on (P52). A BIOS executes a POST (Power Of Self Test) (P53). The POST by the BIOS is a series of diagnostic tests executed when powered on, or when a hardware reset is executed on the computer system. Meanwhile, in this case, the waiting computer is in the power-OFF condition (P54).

The management server starts a server program for a network boot (P55), and the primary computer executes the network boot from the management server (P56). In this case, the following is the boot priority order in the primary computer: 1) the network boot, and 2) the SAN boot.

The management server delivers a setting program for the WWN to the primary computer (P57), and the primary computer collects information such as the WWN, and changes the setting for the priority order of the network boot/the SAN boot (P58).

The collected information is notified to the management server. The management server generates a management table of the WWN based on the collected information (P59).

The primary computer re-boots, executes the POST by the BIOS (P510), and starts the user OS with the SAN boot (P511). In this case, the following is the boot priority order in the primary computer: 1) the SAN boot, and 2) the network boot.

After that, a fault occurs in the primary computer (P512), and the primary computer is stopped (P513).

When the management server detects the event of a fault of the primary computer (P514), the management server instructs to the spare computer to turn on the power (P515). The spare computer is powered on (P516), and the BIOS executes the POST (P517).

The management server starts the server program for the network boot (P518), and the spare computer executes the network boot from the management server (P519). In this case, the following is the boot priority order in the spare computer: 1) the network boot, and 2) the SAN boot.

The management server delivers the setting program for the WWN to the spare computer (P520), and the spare computer sets information such as the WWN, and changes the setting for the priority order of the network boot/the SAN boot (P521).

The collected information is notified to the management server. The management server updates the management table of the WWN based on the collected information (P522).

The spare computer re-boots, executes the POST by the BIOS (P523), and starts the user OS with the SAN boot (P524). In this case, the following is the boot priority order in the waiting computer: 1) the SAN boot, and 2) the network boot.

As illustrated in FIG. 15, it is necessary to start the OS two times (P56 and P511 for the primary computer, and P519 and P524 for the spare computer) to cause the managed computer (here, the primary computer and the spare computer) to start operating.

In the technique illustrated in FIG. 15, when the managed computer is terminated (before the power OFF), it is necessary to certainly return the boot priority order to an original order so that an order of the network boot becomes the first priority order.

However, when the managed computer is powered off without the network boot order being returned to the first priority in the boot priority order setting for the managed computer since the managed computer is abnormally terminated because of the software fault and so on, and when the power is turned on at the next time, the managed computer is not able to network-boot from the managing server to execute the setting program, and to control to rewrite the WWN.

A new WWN value to be set in an HBA (Host Bus Adapter) of the computer is normally stored in a volatile memory area. The factory default WW value should be a unique ID in the world. When the new WWN value is stored in a nonvolatile memory, such a problem may be induced that the WWN value is duplicated. Thus, the volatile memory area is used to store the new WWN value so that the factory default WWN value becomes effective when the power is turned off.

That is, in the technique illustrated in FIG. 15, when the managed computer is powered off without the network priority order being returned to the first priority in the boot priority order, the WWN value is returned to a factory default value, so that the managed computer can not execute even the SAN boot. Thus, the managed computer becomes unable to be managed from the managing server.

As described above, the following two problems are included in the technique illustrated in FIG. 15. That is:
A: It is necessary to start the OS twice to cause the managed computer to start operating, therefore it's time consuming to start; and
B: When the software fault occurs in the managed computer, the managing server may be unable to control the managed computer.

SUMMARY

According to one aspect of the invention, a boot controlling method is performed in a management server managing one or a plurality of managed computers through a management network. The method includes receiving, in the management server, a boot request from the managed computer, transferring, in the management server, to the managed computer issuing the boot request, a program setting a unique ID to a port included in the managed computer, and setting, in the managed computer, the unique ID to the port by executing the program setting the unique ID, and executes a booting process according to a predetermined boot priority order.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a server management table;

DESCRIPTION OF EMBODIMENTS

Preferred embodiments of the present invention is explained with reference to accompanying drawings.

Figure 1:
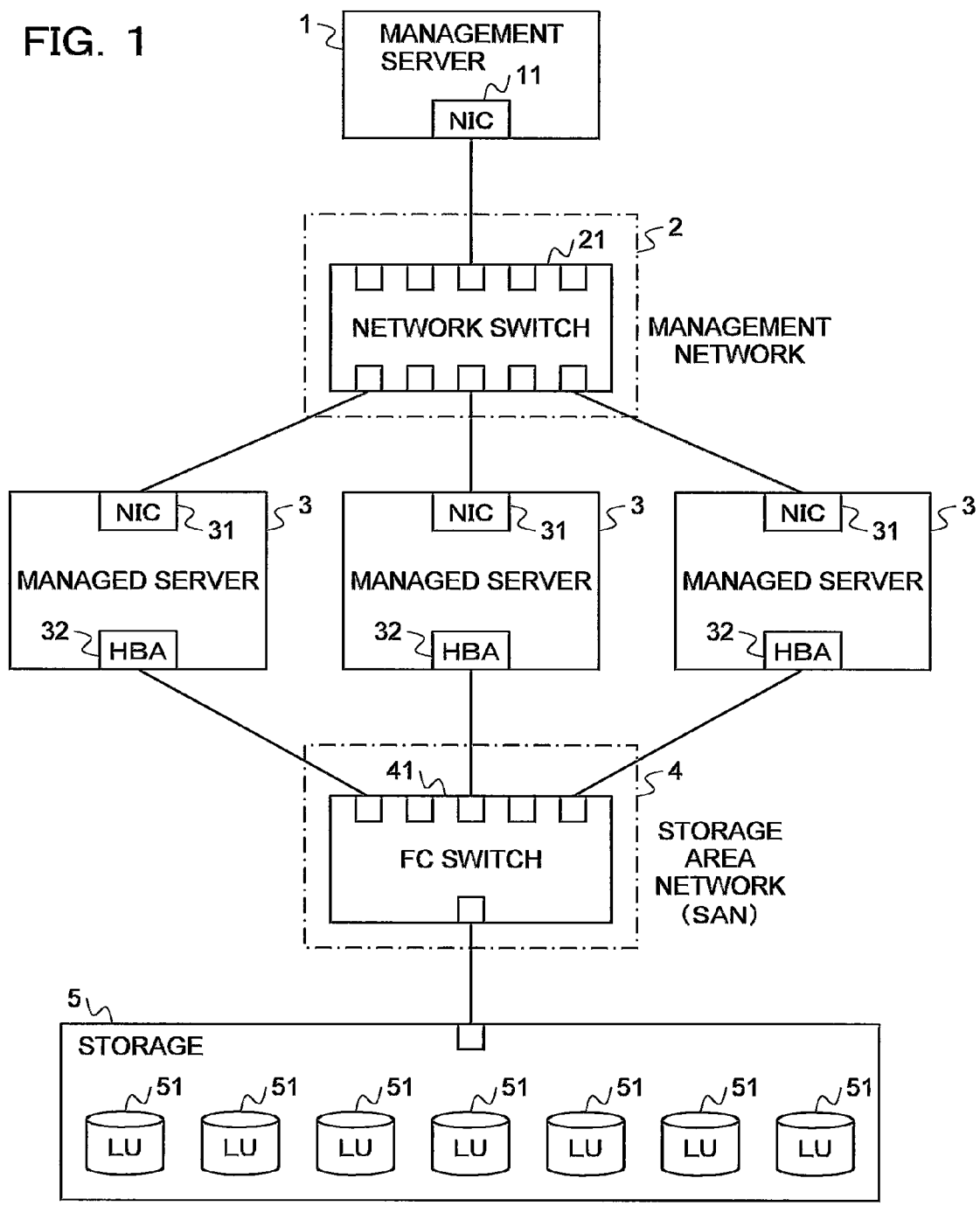
FIG. 1 is a diagram illustrating an example of a configuration of a redundant computer system in a SAN environment.

FIG. 1 is a diagram illustrating an example of a configuration of the redundant computer system in the SAN environment of an embodiment of the present invention.

This computer system includes a management server 1, a management network 2, a plurality of managed servers 3, a storage area network (SAN) 4, and a storage (storage apparatus) 5. The management server 1 is connected to a plurality of the managed servers 3 through the management network 2. The plurality of the managed servers 3 is connected to the storage 5 through the SAN 4.

The management server 1 manages and controls the managed server 3. For example, the management server manages the setting and the condition of the managed server 3, controls to boot, detects the abnormality, and controls the switch from an primary system to a spare system.

The management server 1 includes an NIC (Network Interface Card) 11, and each of a plurality of the managed servers 3 includes an NIC 31. A network switch 21 is located in the management network 2, and as illustrated in FIG. 1, the management server 1 and a plurality of the managed servers 3 are connected through the network switch 21.

Each of the plurality of the managed servers 3 includes an HBA (Host Bus Adapter) 32. An FC (Fibre Channel) switch 41 is located in the SAN 4, and as illustrated in FIG. 1, the plurality of the managed servers 3 and the storage 5 are connected through the FC switch 41. When the managed server 3 executes the SAN boot, the managed server 3 boots a program (software image) such as the OS from the storage 5 through the SAN 4, and accesses data of the storage 5 through the SAN 4.

The storage 5 includes a plurality of logical units (LU) 51. The WWN value, which is the unique ID, is previously assigned to a port of the HBA 32 of the managed server 3. The storage 5 includes correspondence information between the WWN value assigned to the port of the HBA 32 of the managed server 3, and a logical unit number (LUN) of the logical unit 51, and only the access is permitted, which is executed from the port of the HBA 32 of the managed server 3, which includes the specific WWN related to the LU 51.

Figure 2:
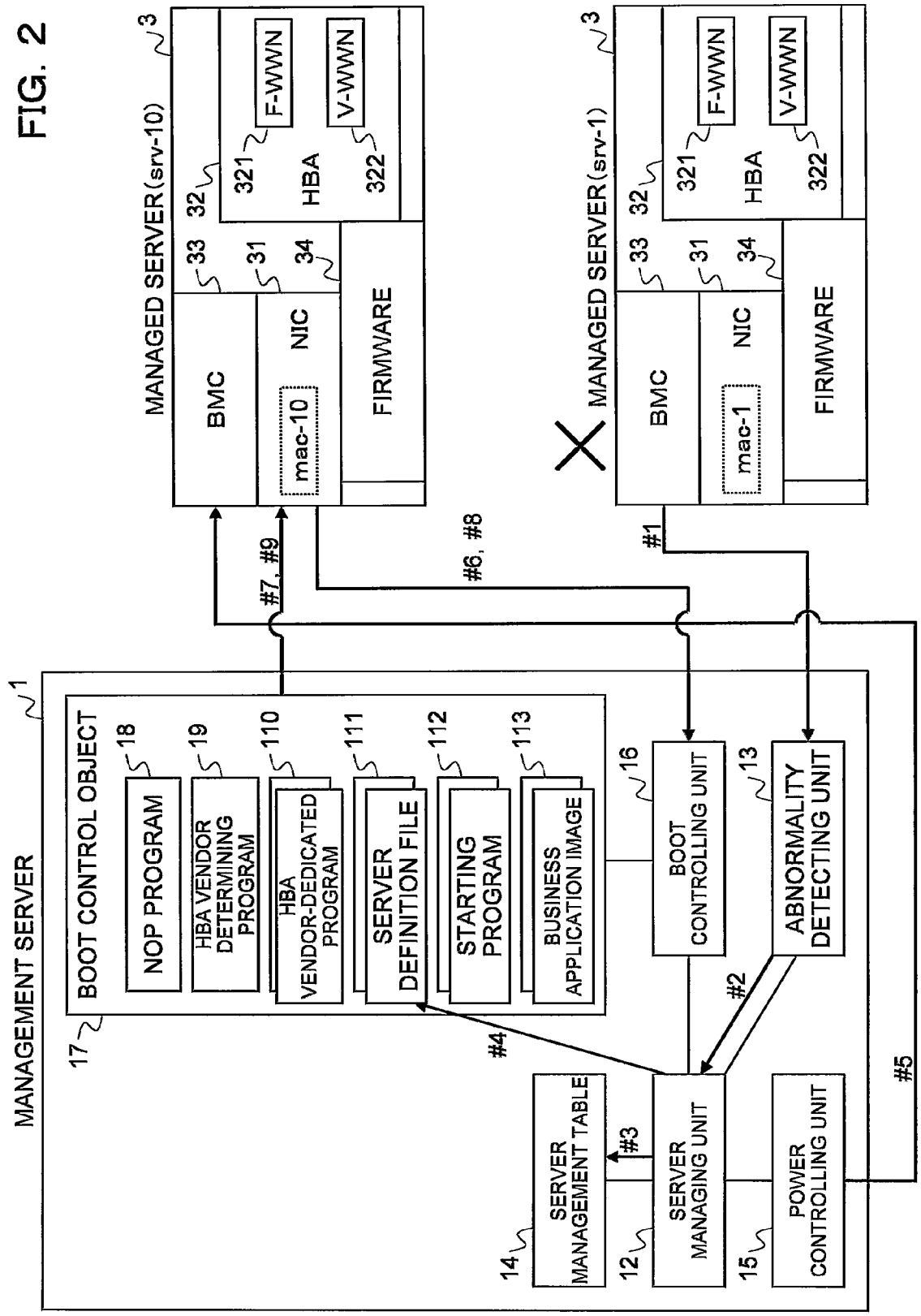
FIG. 2 is a diagram illustrating an example of a configuration of a management server and a managed server in the redundant computer system in the SAN environment.

FIG. 2 is a diagram illustrating an example of a configuration of the management server 1 and the managed server 3 in the redundant computer system in the SAN environment of the embodiment.

The management server 1 of the embodiment includes a server managing unit 12, an abnormality detecting unit 13, a power controlling unit 15, and a boot controlling unit 16. The server managing unit 12 includes a server management table 14. The boot controlling unit 16 includes a boot control object 17. The boot control object 17 includes an NOP (No Operation) program 18, an HBA vendor determining program 19, a plurality of HBA vendor-dedicated programs 110, a server definition file 111, a starting program 112, and a business application image 113.

The NOP program 18 and the HBA vendor determining program 19 are provided in advance. The HBA vendor-dedicated program 110, whose number is the same as the number of HBA vendors, is provided for each HBA vendor in advance. The server definition files 111, whose number is the same as the number of the managed servers 3, are generated for each managed server 3. The starting programs 112, whose number is the same as the number of computer architectures (architecture of a CPU), are provided for each of computer architectures. The business application images 113, whose number is the same as the number of business applications, are provided for each business application.

The server managing unit 12 manages and controls the setting and the condition of each managed server 3, and controls the whole management server 1.

The abnormality detecting unit 13 detects the abnormality such as the failure occurring in the managed server 3.

The server management table 14 is a table for managing the setting and the condition of each managed server 3.

FIG. 3 illustrates an example of the server management table 14. The server management table 14 stores, for each managed server 3 (server name of the managed server 3), a MAC address, an IP address, a boot destination, a boot stage, a boot time, a boot image file name, the WW value, condition information, power information, an IP address of a BMC (Baseboard Management Controller), and spare server information.

The server name is a name for uniquely identifying each managed server 3. The MAC address and the IP address are the MAC address of the NIC 31 provided in the managed server 3, and the IP address assigned to the NIC 31 respectively.

The boot destination is information indicating whether the managed server 3 executes the booting process with the network boot (net), or executes the booting process with the SAN boot (san). The boot stage is information indicating such a condition whether or not HBA 32 can be re-initialized by accessing an initialization code stored in the HBA 32 after rewriting the WWN value of the HBA 32 of the managed server 3. Here, such a condition is illustrated that when the boot stage is "2", the HBA 32 can not be reinitialized by accessing the initialization code stored in the HBA 32, so that the HBA 32 is re-initialized by a reset operation. The boot time is time when the booting process is started. The boot image file name is a file name of the software image including the OS, which is read by the managed server 3 in the booting process.

The WWN value includes the WWNN value (WWNN), which is the WWN value of the HBA (that is, node) 32 of the managed server 3, and the WWPN value (WWPN), which is the WW value of the port provided in the HBA 32 of the managed server 3.

The condition information indicates whether the managed server 3 is normal (ok), or abnormal (ng). The power information indicates whether the power of the managed server 3 is ON or OFF. The IP address of the BMC is an IP address of a BMC 33 provided in the managed server 3. The spare server information indicates the server, that is, the stand-by computer (server name of the stand-by computer), which takes over the business application when the primary server is stopped.

The power controlling unit 15 controls ON/OFF of the power of the managed server 3 according to an instruction by the server managing unit 12.

The boot controlling unit 16 controls the booting process of the managed server 3. Here, a function of the boot controlling unit 16 is also referred to as a boot server. To enable the managed server 3 to boot from the storage 5 with the one time booting process, or to access data for the storage 5, the boot controlling unit 16 transfers the HBA vendor-dedicated program 110 for rewriting the WWN value of the HBA 32 to the managed server 3. The boot controlling unit 16 responds to only a boot request from the managed server 3 with the MAC address registered in the server management table 14, and fixes the network boot as the first priority order without changing the boot priority order of the managed server 3. The boot controlling unit 16 manages the condition of the managed server 3 in the boot stage of the server management table 14, and determines whether the NOP program 18 or the HBA vendor-dedicated program 110 is transferred according to the boot stage for a PXE request, which is the boot request from the managed server 3.

The NOP program 18 is the firmware which is transferred to the managed server 3 for another PXE request after the reset operation for the managed server 3, and executes the booting for the managed server 3 when the boot stage is "2", that is, when the initialization code stored in the HBA 32 is accessed and the HBA 32 can not be re-initialized. Here, the NOP does not mean to do nothing at all, but means not to set the WW value of the HBA 32.

The HBA vendor determining program 19 is the firmware, which is transferred to the managed server 3 and determines the HBA vendor based on a vendor ID and a device ID of the HBA 32 when the boot stage is "1". Based on a result of the determination for the HBA vendor by the HBA vendor determining program 19, the HBA vendor-dedicated program 110 to be transferred to the managed server 3 is specified.

The HBA vendor-dedicated program 110 is the firmware, which sets the WW value to the HBA 32 of the managed server 3 when the boot stage is "1", and which executes the booting for the managed server 3 when the initialization code stored in the HBA 32 is accessed, and the HBA 32 can be re-initialized. The HBA vendor-dedicated program 110 writes the WW value to be set in the volatile memory of the HBA 32 to cause the WWN value to be returned to the factory default value when the power supply for the HBA 32 is stopped. The HBA vendor-dedicated program 110 re-loads the initialization code stored in the HBA 32 in the memory to execute the initializing process, so that the HBA vendor-dedicated program establishes the connection to the SAN 4 with the set WW value without re-booting the managed server 3. When it is failed to re-load the initialization code stored in the HBA 32 in the memory, the HBA vendor-dedicated program 110 calls again the POST process by the BIOS with the reset operation, and causes the set WW value to be effective. In this case, the HBA vendor-dedicated program 110 notifies the managing server 1 of the update to the boot stage="2".

The server definition file 111 is definition data generated from information managed in the server management table 14 to execute the booting process for the managed server 3.

Figure 4A:
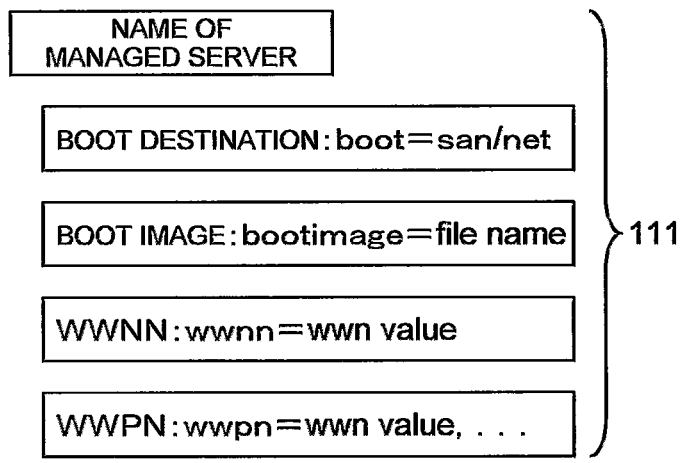
FIG. 4A and FIG. 4B illustrate an example of a server definition file.

FIG. 4 illustrates an example of the server definition file 111. As illustrated in FIG. 4A, the server definition file 111 stores, for each managed server 3 (name of the managed server 3), information indicating a boot destination (network boot/SAN boot) of the managed server 3, a file name of a boot image of the managed server 3, the WW value (WWNN) of the HBA 32 of the managed server 3, and the WWPN value (WWPN) of the port provided in the HBA 32 of the managed server 3.

Figure 4B:
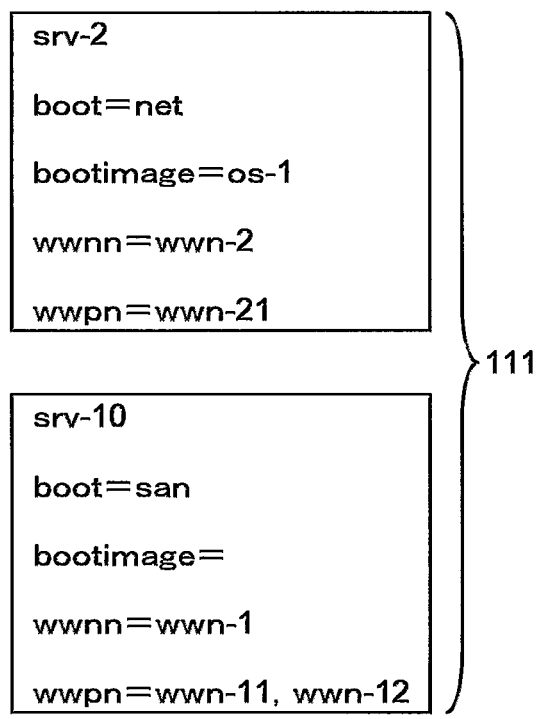

For example, FIG. 4B illustrates the server definition file 111 of the managed server 3 (server name "srv-10"), and the server definition file 111 of the managed server 3 (server name "srv-2"), which are generated from data managed by the server management table 14 illustrated in FIG. 3. Meanwhile, the server definition file 111 of the managed server 3 (server name "srv-10") is used when the managed server 3 (server name "srv-10") is started as a spare server of the managed server 3 (server name "srv-1").

The starting program 112 is a program for obtaining and starting an OS image when the managed server 3 executes the network boot from the managing server 1.

The business application image 113 is the software image including the OS, and is read from the managing server 1 to the managed server 3 when the managed server 3 executes the network boot from the managing server 1.

The managed server 3 of the embodiment includes the NIC 31, the HBA 32, the BMC 33 and the firmware 34.

The NIC 31 is an interface for communicating with the managing server 1, and is assigned with the unique MAC address respectively.

The HBA 32 is an interface for connecting to the SAN, and an F-WWN 321, which is the factory default WW value uniquely assigned in the world, is held in the nonvolatile memory such as a ROM. A V-WWN 322, which is the WWN value set by the HBA vendor-dedicated program 110, is written in the volatile memory.

The BMC 33 notifies the management server 1 of the event of a fault of the managed server 3, and supports a power operation and a remote operation such as the reset operation by the managing server 1.

The firmware 34 is the general firmware of the managed server 3, and executes the POST process by the BIOS, and so on when the managed server 3 is started.

Figure 5:
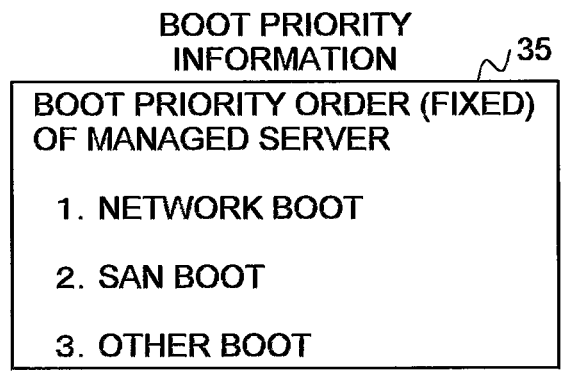
FIG. 5 illustrates a fixed boot priority order of the managed server.

FIG. 5 illustrates the fixed boot priority order of the managed server 3. Boot priority information 35 is held in a predetermined memory managed by the BIOS of the managed server 3. As illustrated in FIG. 5, the boot priority order of the managed server 3 is fixed as follows:
1. the network boot;
2. the SAN boot; and
3. other boot.

A boot procedure will be described below by using FIG. 2, which is executed when the fault occurs in the active managed server 3 (server name "srv-1"), and is switched with the stand-by managed server 3 (server name "srv-10").

When the failure occurs in the active managed server 3 (server name "srv-1"), the abnormality detecting unit 13 receives a trap from the BMC 33 of the managed server 3, in which the failure occurs (#1).

The abnormality detecting unit 13 notifies the server managing unit 12 of information (server name "srv-1", IP address "ip-1", a type of a failure and so on) on the managed server 3, in which the failure occurs (#2).

The server managing unit 12 refers to a record of the server name "srv-1" of the server management table 14 (refer to FIG. 3), determines that the spare server is the server name "srv-10", copies the IP address "ip-1", the boot destination "san", the boot image "-", and information (WWNN "wwn-1", WWPN "wwn-11, and wwn-12") on the WWN of the server name "srv-1" to the record of the server name "srv-10", and sets the boot stage of the record of the server name "srv-10" to "1". The server managing unit 12 deletes the IP address, the boot destination, the boot image, and the information on the WWN of the record of the server name "srv-1", and sets "ng" to the condition information (#3).

The server managing unit 12 generates the server definition file 111 (refer to FIG. 4B) for the managed server 3 (server name "srv-10") based on information on the server name "srv-10" of the server management table 14 (#4).

The power controlling unit 15 connects with the BMC 33 (IP address "ip-b1") of the managed server 3 (server name "srv-1"), and turns off a power. The power controlling unit 15 connects with the BMC 33 (IP address "ip-b10") of the managed server 3 (server name "srv-10"), and turns on a power (#5). In this case, the power controlling unit 15 updates power information of the record of the server name "srv-1" of the server management table 14 to "off", and updates the power information of the record of the server name "srv-10" to "on".

After the power is turned on, the managed server 3 (server name "srv-10") executes the POST process with the firmware 34, starts a PXE initializing process, and transfers the PXE request (boot request) to the boot controlling unit 16 (boot server) of the managing server 1 (#6).

When receiving the PXE request, the boot controlling unit 16 refers to a column of the boot stage of the record of the server name "srv-10" of the server management table 14 to confirm that the boot stage is "1", and transfers the HBA vendor determining program 19. The firmware 34 (system BIOS) of the managed server 3 (server name "srv-10") receives the HBA vendor determining program 19, and the firmware 34 (system BIOS) executes the HBA vendor determining program 19(#7).

Meanwhile, the program (firmware), which is downloaded from the boot server and is executed in the PXE initializing process, includes such a restriction that a code size should be 32 KB or less. Thus, here, such a program is executed by dividing to three programs (firmware) of the HBA vendor determining program 19, the HBA vendor-dedicated program 110, and the NOP program 18.

When the vendor of the HBA 32 is determined, the corresponding HBA vendor-dedicated program 110 is transferred from the management server 1, and is executed by the managed server 3 (server name "srv-10"). When a PCI initialization code cannot be loaded, the POST process is re-started, and the managed server 3 (server name "srv-10") transfers the PXE request again to the boot controlling unit 16 (boot server) of the managing server 1 (#8). Meanwhile, in this case, the management server 1 is notified of the boot stage="2".

When the boot stage of the record of the server name "srv-10" of the server management table 14 is not "1", and a period of 10 minutes has not elapsed from the boot time, the boot controlling unit 16 transfers the NOP program 18 (#9). The firmware 34 (system BIOS) of the managed server 3 (server name "srv-10") receives the NOP program 18, the NOP program 18 is executed by the firmware 34 (system BIOS), and the SAN boot starts the OS.

Examples of the process executed by the management server 1 and the process executed by the managed server 3 will be described below by using the flowcharts illustrated in FIG. 6 to FIG. 12.

Figure 6:
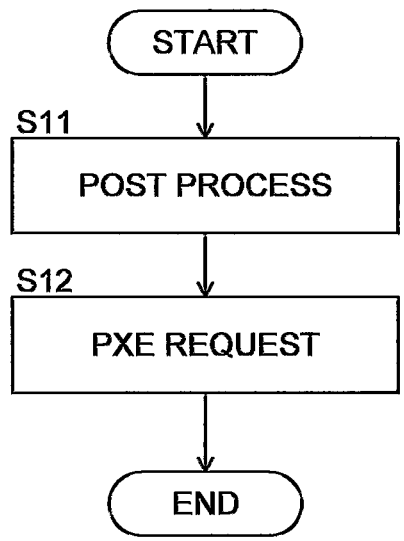
FIG. 6 illustrates a processing flow for a booting process by firmware executed by the managed server.

FIG. 6 illustrates a processing flow for starting the booting process by the firmware 34 executed by the managed server 3.

When the managed server 3 is powered on, the POST (Power Of Self Test) process is executed (step S11). The PXE (Preboot eXeCution Environment) request is transmitted to the managing server 1 (step S12).

Figure 7:
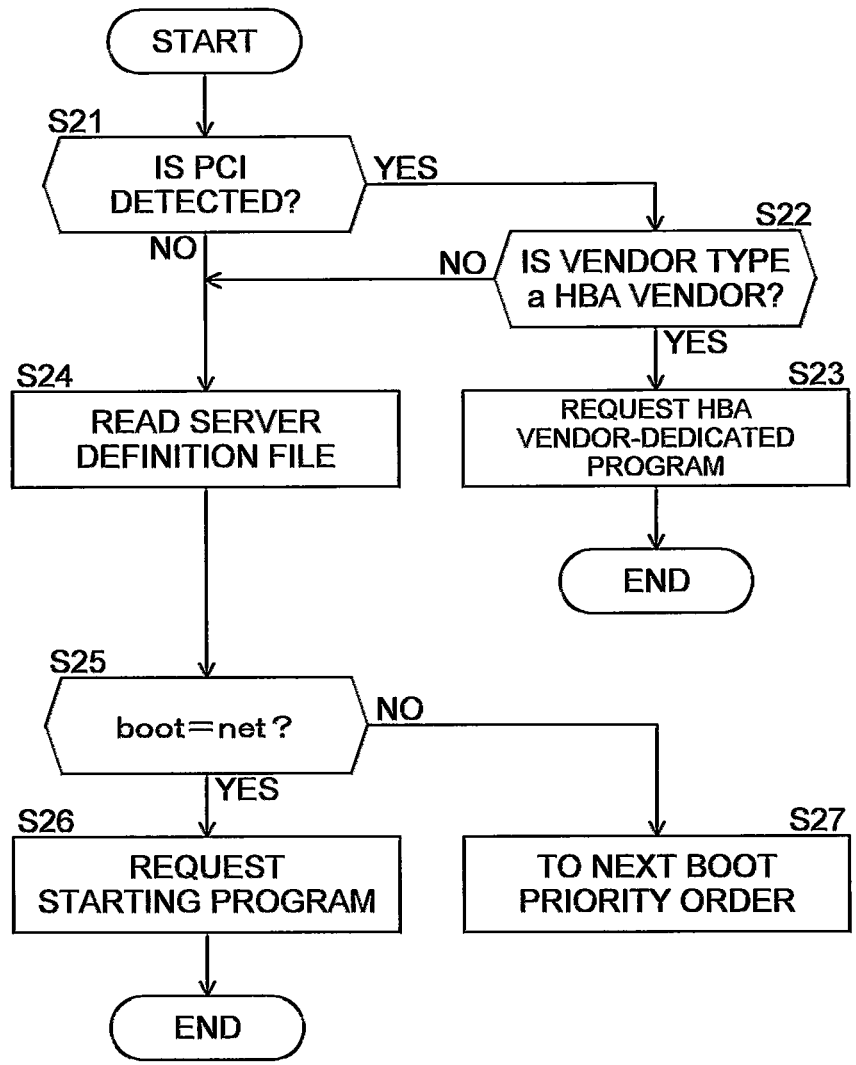
FIG. 7 illustrates a processing flow for a vendor determining process by an HBA vendor determining program executed by the managed server.

FIG. 7 illustrates a processing flow for a vendor determining process by the HBA vendor determining program 19 executed by the managed server 3.

The HBA vendor determining program 19 checks whether or not a PCI (Peripheral Component Interconnect) exists (step S21). Here, the HBA 32 is a kind of PCI. That is, when the PCI is not detected, it means that the managed server 3 does not have the HBA 32. When the PCI is detected, the HBA vendor determining program 19 checks by using the vendor ID and the device ID of the PCI whether or not a vendor type of the PCI is a HBA vendor (step S22). When the vendor type is a HBA vendor, the HBA vendor determining program 19 requests the HBA vendor-dedicated program 110 corresponding to the vendor type to the management server 1 (step S23).

When the PCI is not detected at step S21 (in this case, the WWN does not exist), or when the vendor type is not a HBA vendor at the step S22, the HBA vendor determining program 19 reads the server definition file 111 from the management server 1 (step S24), and checks whether or not the boot destination defined by the read server definition file 111 is the network (boot=net) (step S25). When the boot destination is the network, the HBA vendor determining program 19 requests the starting program 112 to the management server 1 (step S26). When the boot destination is not the network, the process moves to the next priority order (step S27). As a result, when the PCI is not detected, the SAN boot is not executed. When the vendor type of the PCI is not a HBA vendor, the SAN boot is executed with the F-WWN 321.

Since the vendor of the HBA 32 can be specified by the HBA vendor determining program 19, the HBA vendor-dedicated program 110 suitable to the HBA vendor can be specified and be requested.

Figure 8:
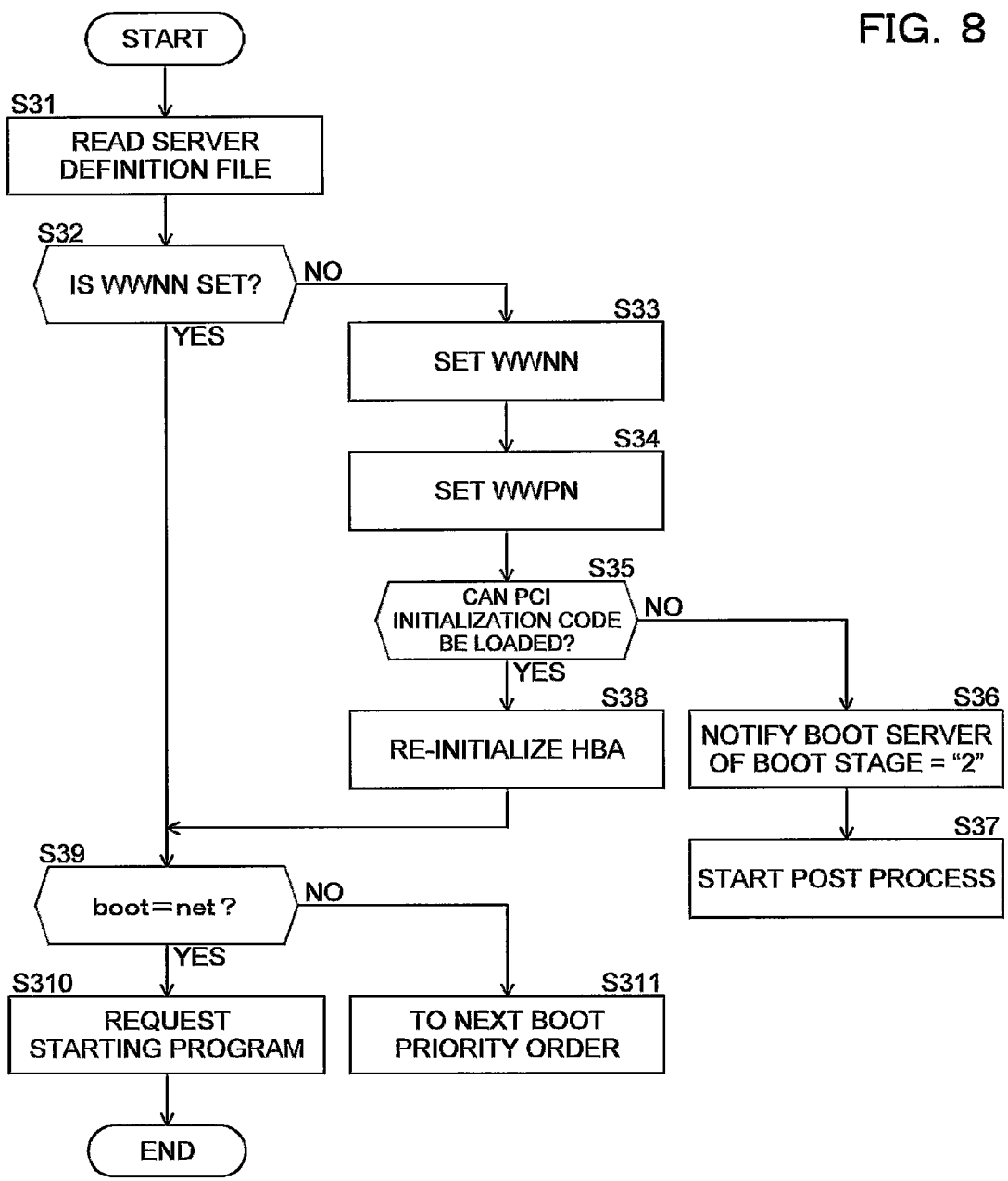
FIG. 8 illustrates a processing flow for a vendor-dedicated process by an HBA vendor-dedicated program executed by the managed server.

FIG. 8 illustrates a processing flow for a vendor-dedicated process by the HBA vendor-dedicated program 110 executed by the managed server 3.

The HBA vendor-dedicated program 110 reads the server definition file 111 from the management server 1 (step S31). The HBA vendor-dedicated program 110 checks whether or not the WWNN is set in the volatile memory of the HBA 32 (step S32). When the WWNN is not set, the HBA vendor-dedicated program 110 sets the WWNN (wwnn=) defined by the server definition file 111 in the volatile memory of the HBA 32 (step S33), and sets the WWPN (wwpn=) defined by the server definition file 111 in the volatile memory of the HBA 32 (step S34). The HBA vendor-dedicated program 110 checks whether or not the PCI initialization code of the HBA 32 can be loaded (step S35). When the PCI initialization code can not be loaded, the HBA vendor-dedicated program 110 notifies the boot controlling unit 16 of the management server 1 of boot stage="2" (step S36), resets the managed server 3, and starts the POST process (step S37). When the PCI initialization code can be loaded, the HBA vendor-dedicated program 110 re-initializes the HBA 32 (step S38).

When the WWNN is set at the step S32, or when the HBA 32 is re-initialized at the step S38, the HBA vendor-dedicated program 110 checks whether or not the boot destination defined by the read server definition file 111 is the network (boot=net) (step S39). When the boot destination is the network, the HBA vendor-dedicated program 110 requests the starting program 112 to the management server 1 (step S310). When the boot destination is not the network, the process moves to the next boot priority order (SAN boot) (step S311).

Figure 9:
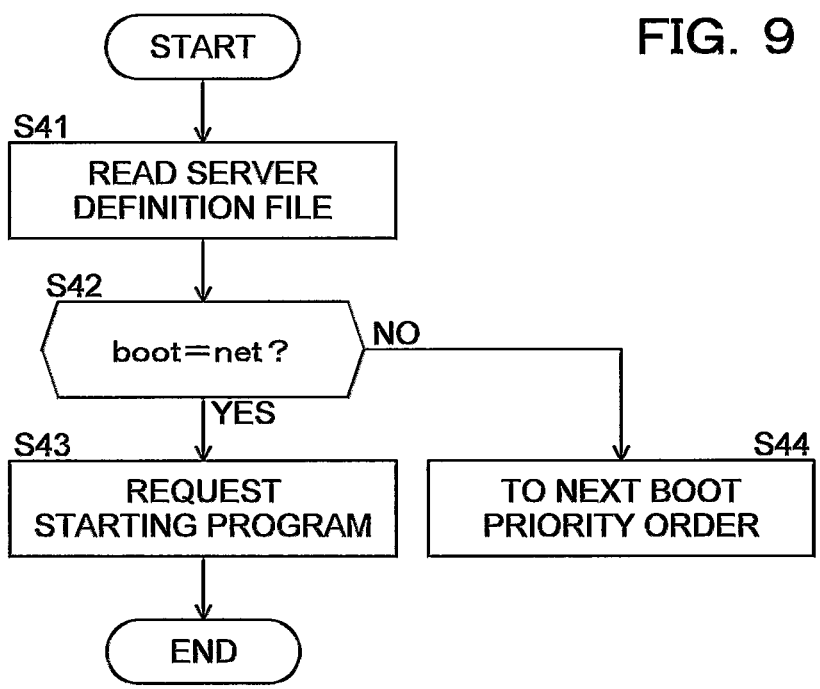
FIG. 9 illustrates a processing flow for an NOP process by an NOP program executed by the managed server.

FIG. 9 illustrates a processing flow for an NOP process by the NOP program 18 executed by the managed server 3.

The NOP program 18 reads the server definition file 111 from the management server 1 (step S41), and checks whether or not the boot destination defined by the read server definition file 111 is the network (boot=net) (step S42). When the boot destination is the network, the NOP program 18 requests the starting program 112 to the management server 1 (step S43). When the boot destination is not the network, the process moves to the next boot priority order (SAN boot) (step S44).

The NOP program 18 does not set the WWN while the HBA vendor-dedicated program 110 sets the WWN. In the booting process after the WWN is set and the reset operation is executed, the booting process can be executed without setting the WWN by executing the NOP program 18.

Figure 10:
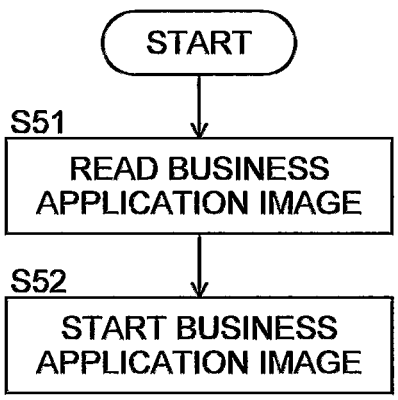
FIG. 10 illustrates a processing flow for a starting process by a starting program executed by the managed server.

FIG. 10 illustrates a processing flow for a starting process by the starting program 112 executed by the managed server 3. The process by the starting program 112 illustrated in FIG. 10 is a process for an OS initialization by the network boot.

The starting program 112 reads the business application image 113 including the OS, which is defined by the boot image (bootimage=) of the server definition file 111 read by another process, from the management server 1 (step S51). The starting program 112 starts the read business application image 113 including the OS (step S52).

Figure 11:
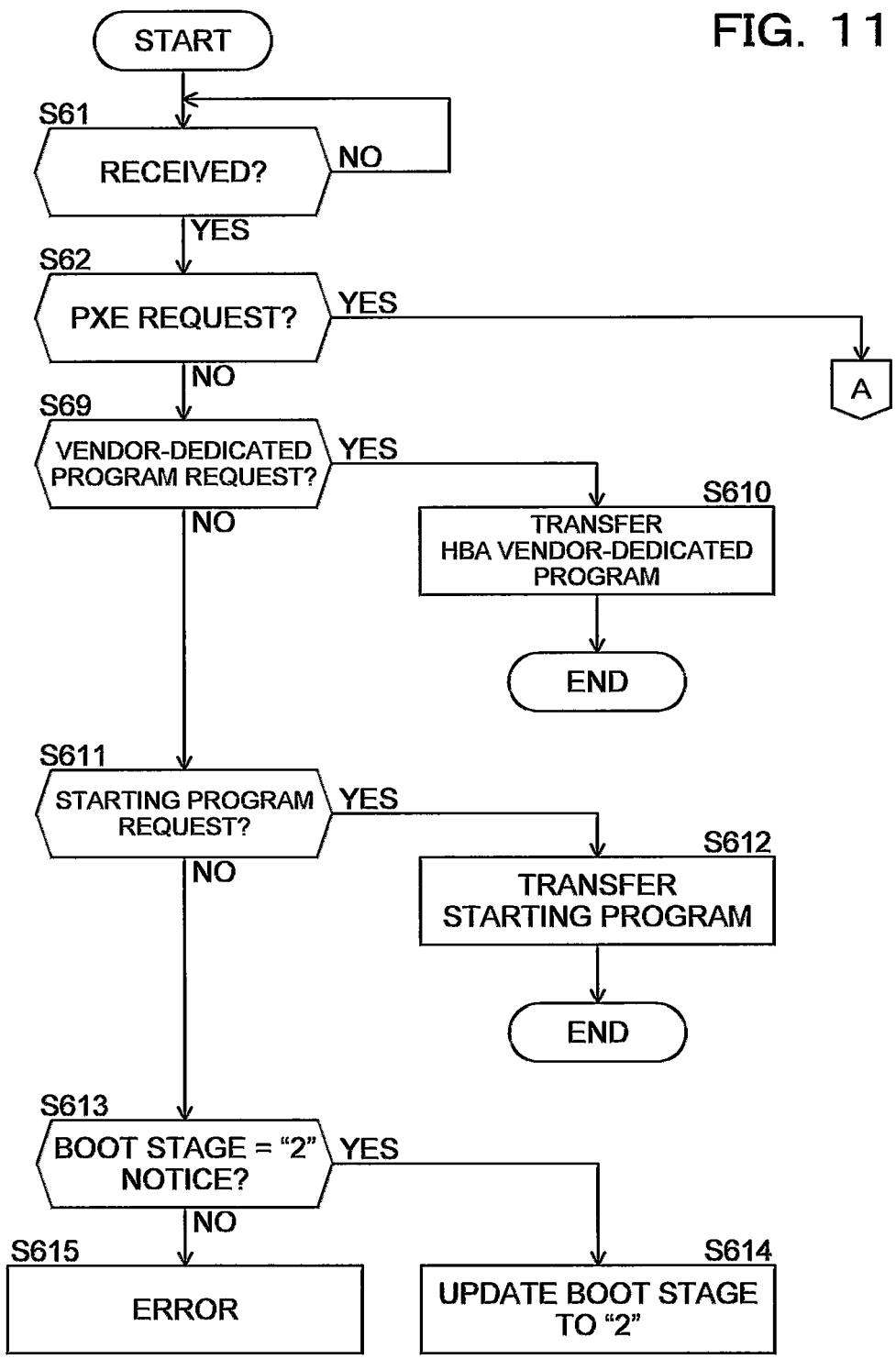
FIG. 11 and FIG. 12 illustrate processing flows for a process executed by a boot controlling unit (boot server) of the managing server.
Figure 12:
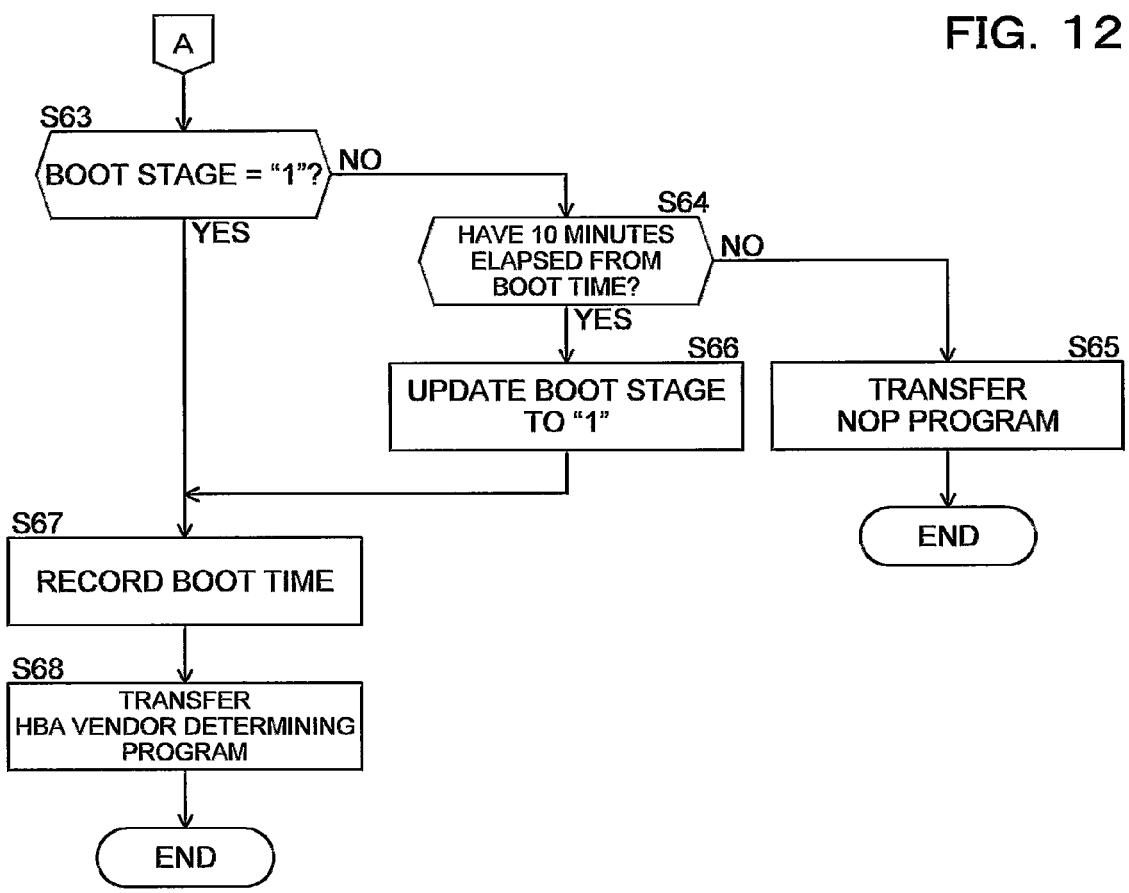

FIG. 11 and FIG. 12 illustrate processing flows for a process executed by the boot controlling unit 16 (boot server) of the management server 1.

The boot controlling unit 16 monitors whether or not a request or a notification is received from the managed server 3 (step S61).

When receiving the PXE request from the managed server 3 (step S62), the boot controlling unit 16 refers to the server management table 14 to check whether or not the boot stage of the managed server 3 is "1" (step S63). When the boot stage is not "1", the boot controlling unit 16 refers to the server management table 14 to check whether or not a period of 10 minutes has elapsed from the boot time of the managed server 3 (step S64). When a period of 10 minutes has not elapsed, the boot controlling unit 16 transfers the NOP program 18 to the managed server 3 (step S65). When a period of 10 minutes has elapsed (for example, network down), the boot controlling unit 16 updates the boot stage of the managed server 3 of the server management table 14 to "1" (step S66).

When the boot stage is "1" at the step S63, or when the boot stage is updated at the step S66, the boot controlling unit 16 records the boot time of the managed server 3 of the server management table 14 (step S67), and transfers the HBA vendor determining program 19 to the managed server 3 (step S68).

As described above, by utilizing the boot stage, which is information indicating boot condition of the managed server 3, the boot controlling unit 16 can easily determine whether or not the boot condition of the managed server 3 is such a condition that the reset operation is executed after the WWN is set.

When the boot controlling unit 16 receives an HBA vendor-dedicated program request from the managed server 3

(step S69), the boot controlling unit 16 transfers the requested HBA vendor-dedicated program 110 to the managed server 3 (step S610).

When the boot controlling unit 16 receives a starting program request from the managed server 3 (step S611), the boot controlling unit 16 transfers the requested starting program 112 to the managed server 3 (step S612).

When the boot controlling unit 16 receives a notification of the boot stage="2" from the managed server 3 (step S613), the boot controlling unit 16 updates the boot stage of the managed server 3 of the server management table 14 to "2" (step S614).

When the boot controlling unit 16 does receive, from the managed server 3, neither the PXE request, the HBA vendor-dedicated program request, the starting program request, nor the notification of the boot stage="2", the boot controlling unit 16 processes as an error (step S615).

A flow of a boot controlling process is described below by using FIG. 13 and FIG. 14, which is executed when the primary managed server 3 is switched with the spare managed server 3. A procedure of the boot controlling process is largely different depending on whether or not a PCI expansion ROM initialization code of an HBA card can be accessed.

Figure 13:
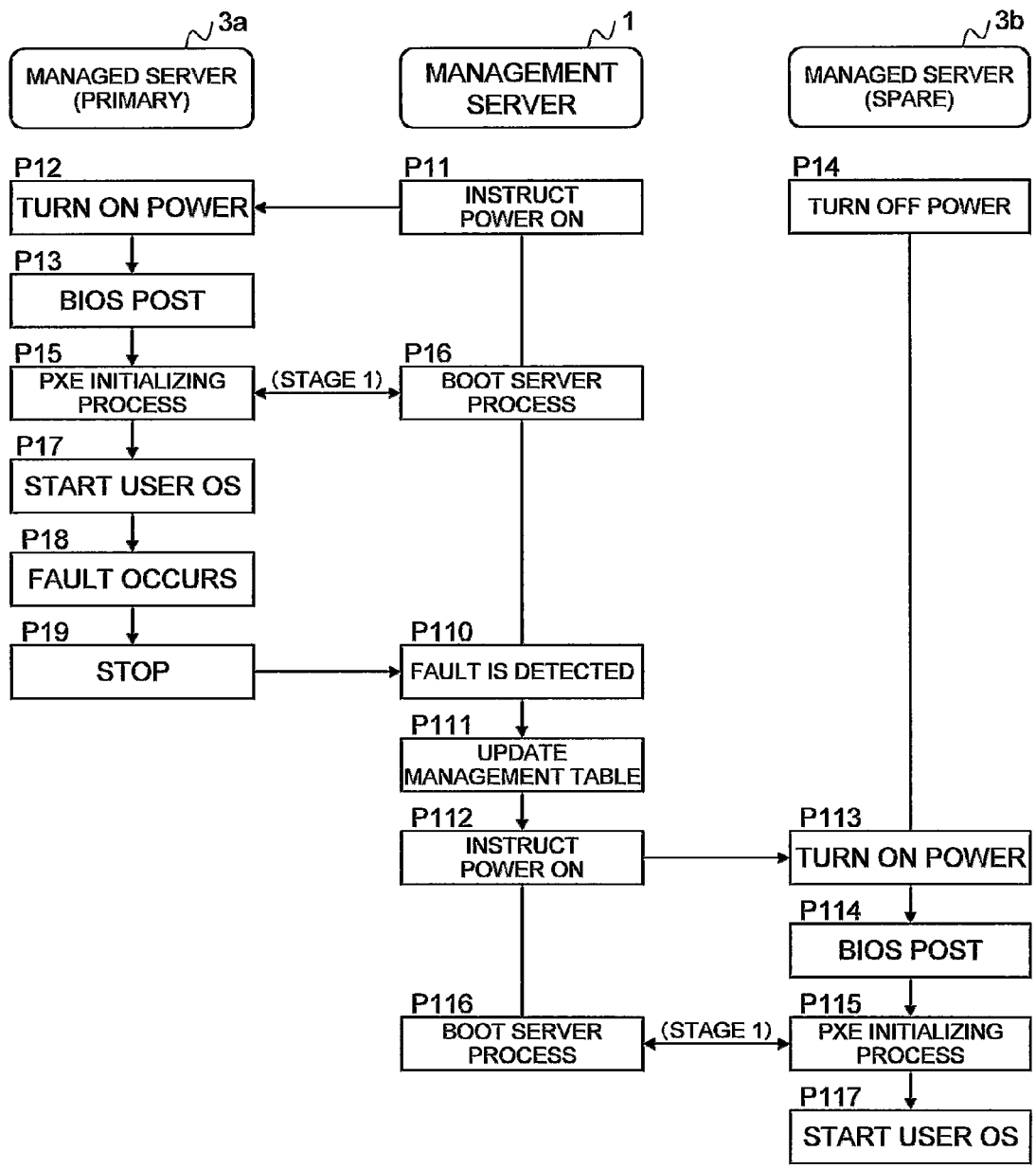
FIG. 13 illustrates a processing sequence for a boot controlling process when a PCI expansion ROM initialization code of an HBA card can be accessed.

FIG. 13 illustrates the processing sequence of the boot controlling process when the PCI expansion ROM initialization code of the HBA card can be accessed.

When the management server 1 instructs the primary managed server 3a to turn on the power (P11), the managed server 3a is powered on (P12), and the POST by the BIOS is executed (P13). Meanwhile, the spare managed server 3b is in the power OFF condition (P14).

The managed server 3a accesses the boot controlling unit 16 of the management server 1 and executes the PXE initializing process (P15). The management server 1 executes a boot server process by the boot controlling unit 16 (P16). The boot stage at this step is "1". The management server 1 transfers the HBA vendor determining program 19 for the PXE request from the managed server 3a, and transfers the HBA vendor-dedicated program 110 of the corresponding HBA vendor for the HBA vendor-dedicated program request from the managed server 3a. Here, even when the HBA vendor-dedicated program 110 rewrites the WWN value in the HBA 32 of the managed server 3a, the PCI expansion ROM initialization code of the HBA 32 can be accessed, so that the HBA 32 can be re-initialized without executing the reset operation. The managed server 3a starts the OS with the SAN boot (P17).

After that, a fault occurs in the managed server 3a (P18), and the managed server 3a is stopped (P19).

When the management server 1 detects the event of a fault of the managed server 3a (P110), the management server 1 updates the server management table 14 (P111), and instructs the spare managed server 3b to turn on the power (P112). The spare managed server 3b is powered on (P113), and the BIOS executes the POST (P114).

The managed server 3b accesses the boot controlling unit 16 of the management server 1 and executes the PXE initializing process (P115). The management server 1 executes the boot server process by the boot controlling unit 16 (P116). The boot stage at this step is "1". The managing server 1 transfers the HBA vendor determining program 19 for the PXE request from the managed server 3b, and transfers the HBA vendor-dedicated program 110 of the corresponding HBA vendor for the HBA vendor-dedicated program request from the managed server 3b. Here, the setting for the WWN is changed in the HBA 32 of the managed server 3b. The PCI expansion ROM initialization code of the HBA 32 can be accessed, so that the HBA 32 is re-initialized without executing the reset operation. The managed server 3b starts the OS with the SAN boot (P117).

Figure 14:
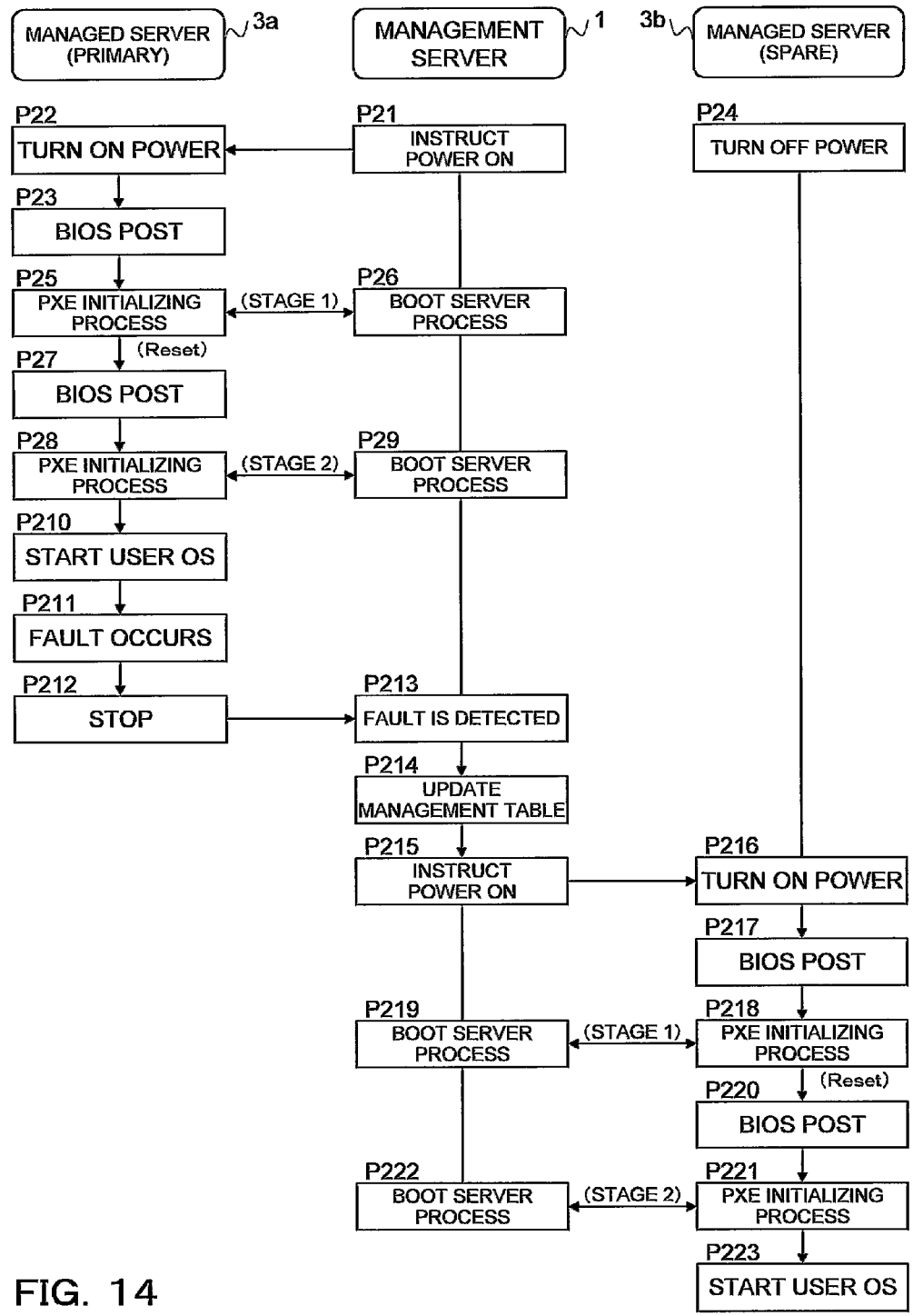
FIG. 14 illustrates the processing sequence for the boot controlling process when the PCI expansion ROM initialization code of the HBA card can not be accessed.
Figure 15:
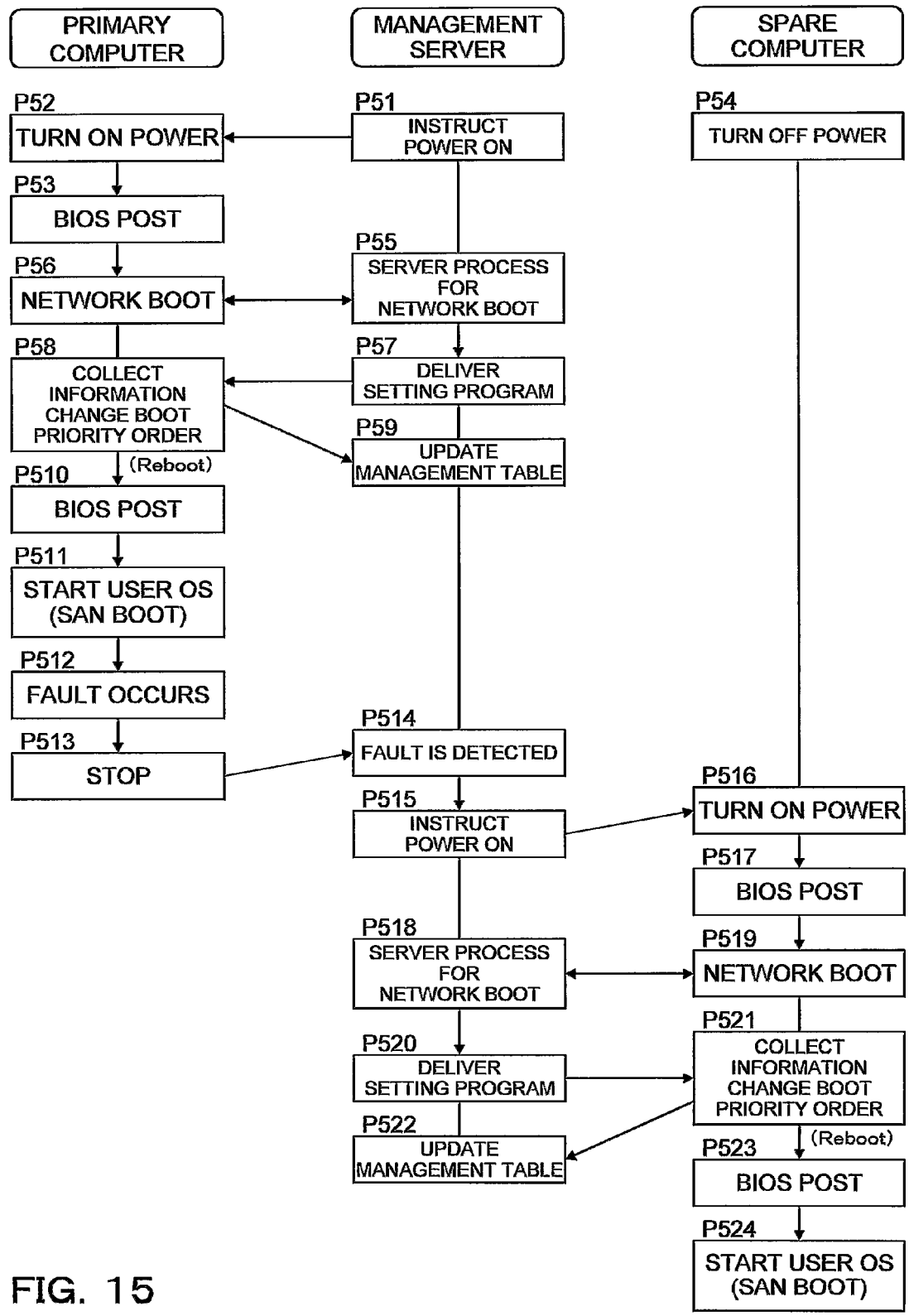
FIG. 15 illustrates a processing sequence by the redundant computer system booting up from the SAN.

FIG. 14 illustrates a processing sequence for the boot controlling process when the PCI expansion ROM initialization code of the HBA card cannot be accessed.

When the management server 1 instructs the primary managed server 3a to turn on the power (P21), the managed server 3a is powered on (P22), and the BIOS executes the POST (P23). Meanwhile, the spare managed server 3b is in the power OFF condition (P24).

The managed server 3a accesses the boot controlling unit 16 of the management server 1, and executes the PXE initializing process (P25). The management server 1 executes the boot server process by the boot controlling unit 16 (P26). The boot stage at this step is "1". The management server 1 transfers the HBA vendor determining program 19 for the PXE request from the managed server 3a, and transfers the HBA vendor-dedicated program 110 of the corresponding HBA vendor for the HBA vendor-dedicated program request from the managed server 3a. Here, when the HBA vendor-dedicated program 110 rewrites WWN value in the HBA 32 of the managed server 3a, the PCI expansion ROM initialization code of the HBA 32 can not be accessed, so that it is necessary to reset the managed server 3a at one time.

The managed server 3a executes the POST by the BIOS (P27), accesses the boot controlling unit 16 of the management server 1, and executes the PXE initializing process (P28). The management server 1 executes the boot server process by the boot controlling unit 16 (P29). The boot stage at this step is "2". The management server 1 transfers the NOP program 18 for the PXE request from the managed server 3a. The managed server 3a starts the OS with the SAN boot (P210).

After that, a fault occurs in the managed server 3a (P211), and the managed server 3a is stopped (P212).

When the management server 1 detects the event of a fault of the managed server 3a (P213), the management server 1 updates the server management table 14 (P214), and instructs the spare managed server 3b to turn on the power (P215). The spare managed server 3b is powered on (P216), and the POST by the BIOS is executed (P217).

The managed server 3b accesses the boot controlling unit 16 of the management server 1, and executes the PXE initializing process (P218). The management server 1 executes the boot server process by the boot controlling unit 16 (P219). The boot stage at this step is "1". The management server 1 transfers the HBA vendor determining program 19 for the PXE request from the managed server 3b, and transfers the HBA vendor-dedicated program 110 of the corresponding HBA vendor for the HBA vendor-dedicated program request from the managed server 3b. Here, the setting for the WWN is changed in the HBA 32 of the managed server 3b. Here, the PCI expansion ROM initialization code of the HBA 32 cannot be accessed, so that it is necessary to reset the managed server 3a at one time.

The managed server 3b executes the POST by the BIOS (P220), accesses the boot controlling unit 16 of the management server 1, and executes the PXE initializing process (P221). The management server 1 executes the boot server process by the boot controlling unit 16 (P222). The boot stage at this step is "2". The management server 1 transfers the NOP program 18 for the PXE request from the managed server 3b. The managed server 3b starts the user OS with the SAN boot (P223).

As illustrated in FIG. 13 and FIG. 14, by arbitrarily utilizing the HBA vendor determining program 19, the HBA vendor-dedicated programs 110, and the NOP program 18, it is possible to complete the booting process at one time when the managed server 3 is started.

As disclosed above, the discussed computer system of an embodiment of the present invention is the computer system in which one or a plurality of managed computers are connected with a management server managing one or a plurality of the managed computers through a management network. The management server comprises a boot controlling unit executing boot control for one or a plurality of the managed computers. The boot controlling unit transfers, to the managed computer issuing a boot request, a program setting a unique ID to a port equipped by the managed computer. The managed computer sets the unique ID to the port by executing the program setting the unique ID, and executes a booting process according to a predetermined boot priority order.

Also, the boot controlling program of an embodiment of the present invention is the boot controlling program executed by a management server managing one or a plurality of managed computers through a management network. The program causes the management server as a computer to execute receiving a boot request from the managed computer, and transferring a program setting a unique ID to a port equipped by the managed computer to the managed computer executing issuing the boot request. The managed computer sets the unique ID to the port by executing the program setting the unique ID, and executes a booting process according to a predetermined boot priority order.

According to an embodiment of the present invention, since the boot priority order of the managed computer is fixed in the predetermined order (for example, the order of the network boot and the SAN boot), the managed computer does not become unable to be controlled, and the highly reliable system operation can be realized.

According to an embodiment of the present invention, since the booting process of the managed computer is completed at one time, time can be saved to hand over the business application to the stand-by computer after the stop of the active computer caused by the failure.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the sprit and scope of the invention.

What is claimed is:

1. A controlling method in a management apparatus managing one or a plurality of computers through a network, the method comprising:
    receiving, in the management apparatus, a boot request from a computer;
    transferring a program from the management apparatus to the computer that issued the boot request, in a case that a booting process is executed by the computer, the program setting a unique identifier to a port of a connection apparatus equipped in the computer;
    setting, in the computer, the unique identifier to the port by executing the program;
    checking, in the computer, whether an initialization code of the connection apparatus to re-initialize the connection apparatus can be accessed by executing the program; and
    executing, in the computer, when the initialization code can be accessed, the booting process via the port to re-initialize the computer without executing a reset operation of the computer by executing the program.

2. The boot controlling method according to claim 1, further comprising:
    preparing, in the management apparatus, a plurality of types of the programs setting the unique identifier according to types of interfaces of the computer;
    transferring, in the management apparatus, a determining program specifying the program setting the unique identifier to the computer issuing the boot request; and
    receiving, in the management apparatus, a request of the program setting the unique identifier specified by the computer executing the determining program, from the computer,
    wherein, in transferring the program setting the unique identifier, the management apparatus transfers the requested program setting the unique identifier to the computer.

3. The boot controlling method according to claim 2, further comprising:
    transferring, in the management apparatus, a program not setting the unique identifier to the computer when the management apparatus receives the boot request from the computer executing a reset operation after setting the unique identifier to the port,
    wherein the computer executes the program not setting the unique identifier, and executes the booting process according to the predetermined boot priority order.

4. The boot controlling method according to claim 3, further comprising:
    storing, in the management apparatus, boot condition information indicating boot condition of the computer; and
    obtaining, in the managing apparatus, from the computer, information indicating that the reset operation is executed after the unique identifier is set to the port, and updating the boot condition information with the obtained information,
    wherein, in transferring the program not setting the unique identifier, the management apparatus transfers the program not setting the unique identifier to the computer when the boot condition information on the computer is the information indicating that the reset operation is executed after the unique identifier is set to the port.

5. The boot controlling method according to claim 1, further comprising:
    transferring, in the managing apparatus, a program not setting the unique identifier to the computer when the management apparatus receives the boot request from the computer executing a reset operation after setting the unique identifier to the port,
    wherein the computer executes the program not setting the unique identifier, and executes the booting process according to the predetermined boot priority order.

6. The boot controlling method according to claim 5, further comprising:
    storing, in the management apparatus, boot condition information indicating boot condition of the computer; and
    obtaining, in the management apparatus, from the computer, information indicating that the reset operation is executed after the unique identifier is set to the port, and updating the boot condition information with the obtained information, wherein, in transferring the program not setting the unique identifier, the management apparatus transfers the program not setting the unique identifier to the computer when the boot condition information on the computer is the information indicating that the reset operation is executed after the unique identifier is set to the port.

7. The boot controlling method according to claim 1, wherein the computer executes the program to set the unique identifier to the port, and to execute the reset operation of the computer when the initialization code of the connection apparatus cannot be accessed.

8. A computer system comprising:
one or a plurality of computers; and
a management apparatus managing the one or the plurality of the computers and being connected to the one or the plurality of the computers through a network,
wherein the management apparatus comprises a boot controlling unit executing boot control for one or a plurality of the computers, and a unit transferring to the computer that issued the boot request, in a case that a booting process is executed by the computer, the program setting a unique identifier to a port of a connection apparatus included in the computer, and
wherein the computer sets the unique identifier to the port by executing the program;
checks whether an initialization code of the connection apparatus to re-initialize the connection apparatus can be accessed by executing the program; and
executes, when the initialization code can be accessed, the booting process via the port to re-initialize the computer without executing a reset operation of the computer by executing the program.

9. A non-transitory computer readable storage medium storing a boot controlling program to cause a management apparatus to execute operations, the management apparatus managing one or a plurality of computers through a network, the operation comprising:
receiving a boot request from a computer; and
transferring a program setting a unique identifier to a port of a connection apparatus included in the computer that issued the boot request, by the management apparatus;
wherein the computer sets the unique identifier to the port by executing the program;
checks whether an initialization code of the connection apparatus to re-initialize the connection apparatus can be accessed by executing the program; and
executes, when the initialization code can be accessed, the booting process via the port to re-initialize the computer without executing a reset operation of the computer by executing the program.

\* \* \* \* \*